United States Patent [19]
Yokoyama

[11] Patent Number: 5,364,255
[45] Date of Patent: Nov. 15, 1994

[54] SCREW POSITION ADJUSTING DEVICE FOR AN INJECTION MOLDING MACHINE

[75] Inventor: Koichi Yokoyama, Matsuto, Japan
[73] Assignee: Sodick Co., Ltd., Kanagawa, Japan
[21] Appl. No.: 91,203
[22] Filed: Jul. 14, 1993
[30] Foreign Application Priority Data
  Jul. 15, 1992 [JP] Japan ............................ 210800/1992
[51] Int. Cl.⁵ ............................................ B29C 45/54
[52] U.S. Cl. ............................ 425/171; 425/192 R; 425/586; 425/587; 425/557
[58] Field of Search .................. 425/171, 192 R, 557, 425/558, 561, 585, 586, 587

[56] References Cited
U.S. PATENT DOCUMENTS

| | | | |
|---|---|---|---|
| 3,358,334 | 12/1967 | Hendry | 425/587 |
| 4,278,354 | 7/1981 | Hehl | 425/558 |
| 4,600,375 | 7/1986 | Honsho et al. | 425/585 |
| 4,704,078 | 11/1987 | Hehl | 425/192 R |
| 4,718,840 | 1/1988 | Inaba et al. | 425/587 |
| 4,846,652 | 7/1989 | Hehl | 425/192 R |
| 5,011,399 | 4/1991 | Farrell | 425/557 |

FOREIGN PATENT DOCUMENTS

46-18275  5/1971  Japan ................................ 425/558

*Primary Examiner*—James Mackey
*Attorney, Agent, or Firm*—Wenderoth, Lind & Ponack

[57] ABSTRACT

Flanges are provided on a screw casing and a cylinder member of a screw driving unit in opposition to each other, and coupled with each other with fastening bolts. An adjusting ring is screwed onto the outer circumference of one of the flanges. The screw member is moved together with the ring in a backward direction until the end of the screw hits. The ring is rotated thereafter to bring it into contact with a side of the other flange, where a datum position is established. The cylinder member is then retreated an adequate amount in this state, and the ring is moved by a specified quantity. The specified quantity, represents the stroke quantity and bolts are fastened so that the ring comes into contact with the side of the other flange. The screw is thereby adjusted in its stroke.

6 Claims, 5 Drawing Sheets

FIG.5  PRIOR ART

SCREW POSITION ADJUSTING DEVICE FOR AN INJECTION MOLDING MACHINE

BACKGROUND OF THE INVENTION

1. Field of the Invention

The present invention is related to an adjusting device for the stroke position of an injection molding machine plasticizing screw when moving axially, suitable in particular for use with a pre-plasticization type injection molding machine separately equipped with a plasticizing part and an injection part, and more particularly to an adjusting device for adjusting a plasticizing screw for a retreat position.

2. Description of the Prior Art

In general there are two types of plasticizing screw equipped injection molding machines, a screw in-line and screw pre-plasticization.

The screw in-line injection molding machine melts and mixes resin with the screw rotating while retreating to weigh melt resin. The screw advances to inject such weighed melt resin into a metallic mold thereafter.

The screw pre-plasticization injection molding machine is furnished separately with a plasticizing part having a plasticizing screw and an injection part having an injection plunger. The plasticizing part rotates the screw to melt and mix resin and forward the resin to the injection part for weighing. The injection plunger injects the melt resin into a metallic mold.

The applicant lately proposed a screw pre-plasticization injection molding machine as shown in the patent laid-open No. 3-97518 that is provided with a hydraulic actuator to move a kneading screw axially in addition to a rotary (electric or hydraulic) motor to turn the kneading screw. The screw retreats in plasticizing and weighing to form an opening between the tip of the screw and a path to send melt resin to the injection chamber of an injection part, while during injecting the path is closed by the tip of the screw being maintained at the forward position. The machine is thereby able to prevent melt resin from flowing backward to the plasticizing chamber when injecting without using a check valve.

Figure 5:
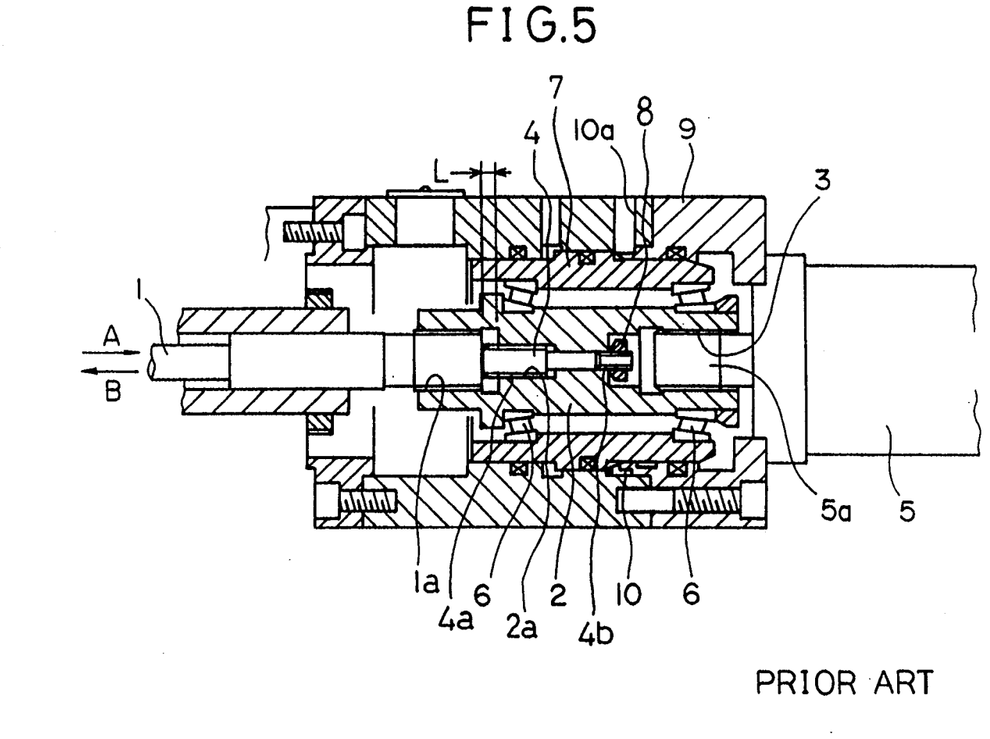
FIG. 5 is a sectional view indicating a conventional screw driving unit.

As shown in FIG. 5, a screw driving unit of an injection molding machine is such that a link shaft 2 is connected to the rear end of a screw 1, the link shaft 2 also being connected to the output shaft 5a of a rotary motor 5 via a spline 3. The link shaft 2 is rotatively supported by a piston member 7 by way of bearings 6, 6. The piston member 7 and a casing 9 together form a hydraulic chamber 10. There is formed a spline 1a at the rear end of the screw 1 to be spline connected with the link shaft 2. There is provided a position adjusting screw unit 4 in the center of the link shaft 2. The position adjusting screw unit 4 is equipped with an adjusting screw part 4a and a lock nut screw part 4b. The adjusting screw part 4a is screwed into a female screw part 2a of the link shaft 2, adjusting a projection quantity L, and a lock nut 8 is fastened to the screw part 4b at a suitable position to be secured to the link shaft 2.

Rotation of the rotary motor is thus transmitted to the screw 1 by way of the link shaft 2 at the time of plasticizing while the screw melts and kneads resin before it presses out melt resin to the injection chamber. Reaction force from such melt resin then acts on the screw 1 in a direction as indicated by an arrow A. The reaction force is received by the casing of the hydraulic chamber so as to cause draining by way of the position adjusting screw unit 4, link shaft 2, bearings 6, 6 and piston member 7.

The rotary motor 5 stops rotating in the injection process and pressurized oil is supplied to the hydraulic chamber 10 by way of an oil path 10a to move the piston member 7 axially and forward the screw 1 in a direction as indicated by an arrow B by way of the bearings 6, 6, link shaft 2 and position adjusting screw unit 4 so as to enable the tip of the screw 1 to keep the path shut to the injection chamber.

When the path leading to the injection chamber is closed with the tip of the screw advanced, resin at the tip of the screw flows into the injection chamber while part of the resin flows backward. It depends greatly on the fluidity or the viscosity of resin in the plasticization chamber how much resin flows backward. If the screw advances a lot, therefore, an error will be caused in weighing. It is desirable, accordingly, that the tip of the screw is retained in a certain position as near to the plasticization casing tip as possible to the extent that melt resin may be sent to the injection chamber without trouble at the time of plasticizing.

The foregoing screw driving unit has the position adjusting screw unit 4 rotating in relation to the link shaft 2 thereby adjusting the projection quantity L to allow the screw to be adjusted for the retreat position, with the tip of the screw unit 4 being brought into contact with the rear end of the screw 1. The screw 1 has a resin reaction force applied in a direction as indicated by an arrow A at the time of plasticizing. As a result, the rear end of the screw 1 comes into contact with the tip of the screw unit 4, which has been adjusted in position in relation to the piston member 7 and the link shaft 2 under the restriction of movement by the hydraulic chamber 10 in a direction as indicated by an arrow A. With this, the tip of the screw 1 is maintained as intended.

Now, referring to the adjusting mechanism based on the position adjusting screw unit 4, it is necessary to remove the rotary motor 5 and loosen the lock nut 8 using a special jig and turn the adjusting screw unit 4 to provide a rotation adjustment, because the screw unit 4 is situated in the center of the link shaft 2.

In addition, the adjusting screw unit 4 is situated inside, it is thereby not possible to provide a direct visual check of the amount of travel using a scale. Instead, it is required to depend on the rotational frequency and touch of the jig for the adjustment of the travel amount. It is difficult therefore, to measure the quantity of adjustment numerically or limit in terms of display. Not only is skill required, but it is difficult to provide accurate and regular positional adjustment.

As mentioned above, as the screw 1 closes the path to the injection chamber with a slight stroke of not more than 1 mm, it is necessary to adjust the screw 1 in position in an accurate manner. Nonetheless, accurate and regular adjustment is extremely difficult.

Furthermore, the position adjusting screw unit 4 is arranged in the center of the link shaft 2. Accordingly, this makes the diameter of the link shaft 2 larger, and the piston member 7 and the casing larger, too. This is an obstacle to downsizing the screw driving unit.

SUMMARY OF THE INVENTION

It is an object of the present invention to provide a screw position adjusting device for an injection molding machine solving the above problem by arranging the device on the outer circumference between a plasticizing cylinder and a screw driving unit cylinder member.

The present invention has been proposed in view of the above, and characteristically comprises a plasticizing screw built in a screw casing, a screw driving unit having a piston member fitted into a cylinder member and a rotary motor secured to the cylinder member to rotate the screw and move the same axially. A first flange is integrated in the screw casing, a second flange is integrated in the cylinder member, a fastening means couples the first and second flanges, and a position adjusting ring member is screwed onto a screw part formed on the outer circumference of either of the first and second flanges. The adjusting ring member projects from either of the flanges, and the projected portion is brought into contact with the other flange when the first and second flanges are coupled with each other by the fastening means.

As an example, the flange to be screwed together with the position adjusting ring member is the second flange, and the outer diameter is made almost the same as the first flange when the position adjusting ring member is screwed onto the second flange.

Preferably, the injection molding machine is of the screw pre-plasticization type, with a plasticizing part and an injection part provided separately. The screw advances to close a path leading to an injection chamber of the injection part with the tip thereof as the piston member moves hydraulically.

Rotation of the rotary motor of the screw driving unit is transmitted to the screw to knead and plasticize resin material in the plasticization process. The piston member is affected by a resin reaction force (back pressure) from the screw, and thereby the piston member at the extracted end comes into contact with the cylinder member, the cylinder member being coupled with the screw casing by means of the position adjusting device. Accordingly, there is produced an adequate clearance between the tip of the screw and that of the screw casing.

The rotary motor stops and the piston member moves the screw in a forward direction in the injection process. The tip of the screw closes the opening of the path at the tip of the screw casing and is maintained in such a position.

For the purpose of adjusting the screw stroke loosen first the fastening means and turn the position adjusting ring member in a backward direction to bring the ring member out of contact with the flange. Then pressurize the screw driving unit in a forward direction to the traveling limit so that the tip of the screw comes into contact with that of the screw casing to shut the opening.

In this position rotate the adjusting ring member in a forward direction to bring the edge into contact with the projecting side to a side of the flange. This marks the screw datum position. Loosen the fastening means to move the screw driving unit in a backward direction.

Rotate the ring member enable it to move forward to a specified quantity. The specified quantity is deemed as a screw stroke quantity, and can be set more minutely and accurately by turning the adjusting ring member while looking at its scale. Move the screw driving unit forward with the adjusting ring rotated a specified quantity, bring the projecting side of the adjusting ring into contact with the side of the flange, and fasten the flanges by means of the fastening member so that the screw is adjusted and positioned for its stroke.

BRIEF DESCRIPTION OF THE DRAWINGS

Referring now to the drawings.

DESCRIPTION OF THE PREFERRED EMBODIMENT

Referring to the drawing, a preferred embodiment of the present invention will now be described.

Figure 1:
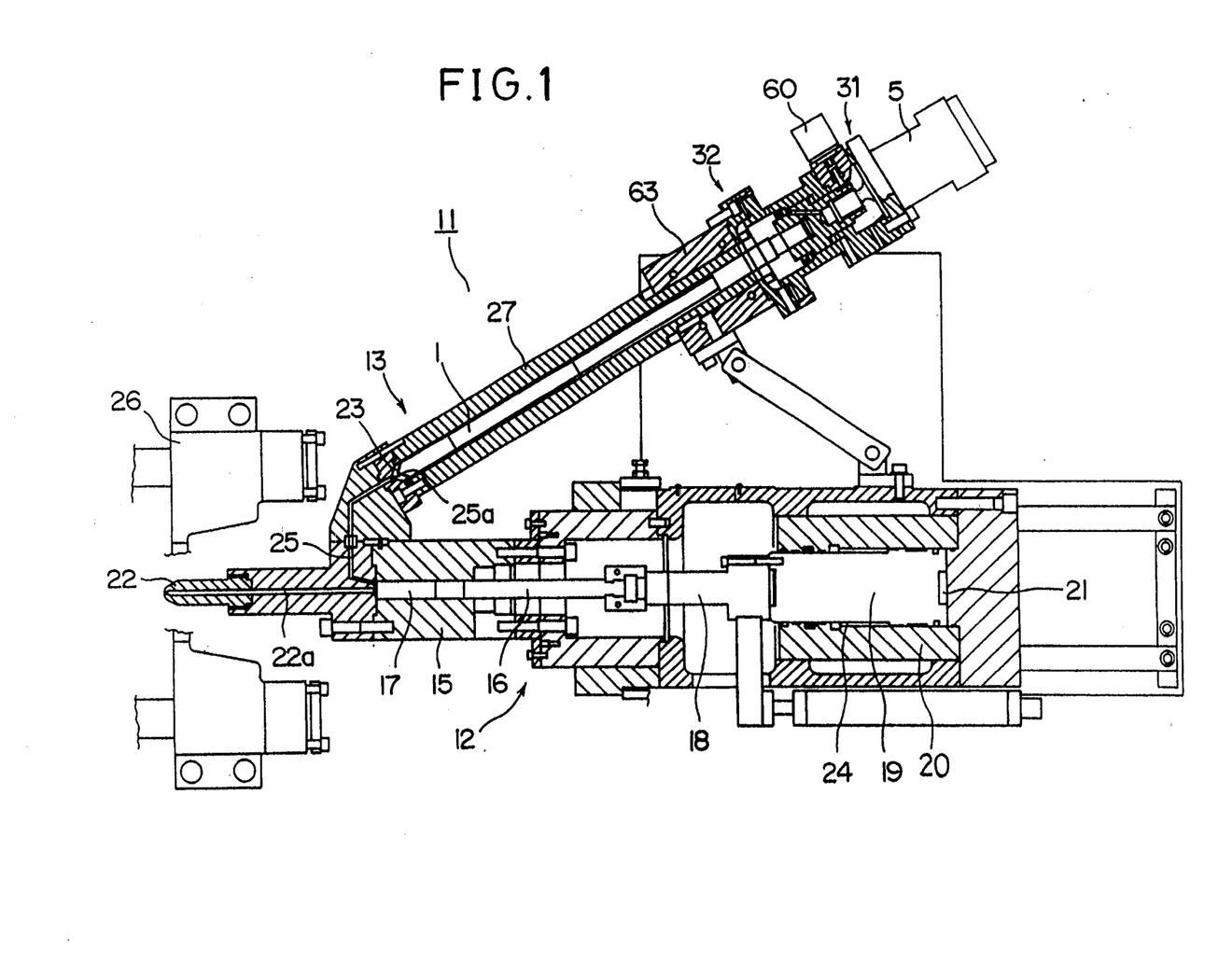
FIG. 1 is a plan sectional view showing a screw pre-plasticization type injection molding machine to which the present invention is applied.

As shown in FIG. 1, a screw pre-plasticization injection molding machine 11 is equipped with an injection part 12 and plasticizing part 13. The injection part 12 has a casing 15 and an injection plunger 16 being inserted in the casing 15. Both the casing 15 and the plunger 16 form an injection chamber 17. In addition, the injection plunger 16 is coupled with a ram 19 by way of a rod 18, the ram 19 being inserted in a cylinder 20 to form an injection hydraulic chamber 21 and a return hydraulic chamber 24. The injection chamber 17 is connected with a path 22a extending to a nozzle 22 and with a path 25 extending from plasticizing chamber 23 of the plasticizing part 13. The nozzle 22 may be connected and disconnected with the inlet of a metallic mold secured to a fixed platen 26.

The plasticizing part 13 is comprised of a screw casing 27 and a plasticizing screw 1 fitted into the casing The casing 27 and the tip of the screw 1 form the plasticizing chamber 23. The tip of the plasticizing chamber is conic in shape and the path 25 has an opening 25a to the top of the cone. The tip of the screw 1 is also conic in shape. When the screw 1 retreats, the opening 25a of the path connects with the plasticizing chamber 23. When the screw 1 advances, the tip of the screw closes the opening 25a to disconnect the plasticizing chamber 23 with the injection chamber 17.

Figure 2:
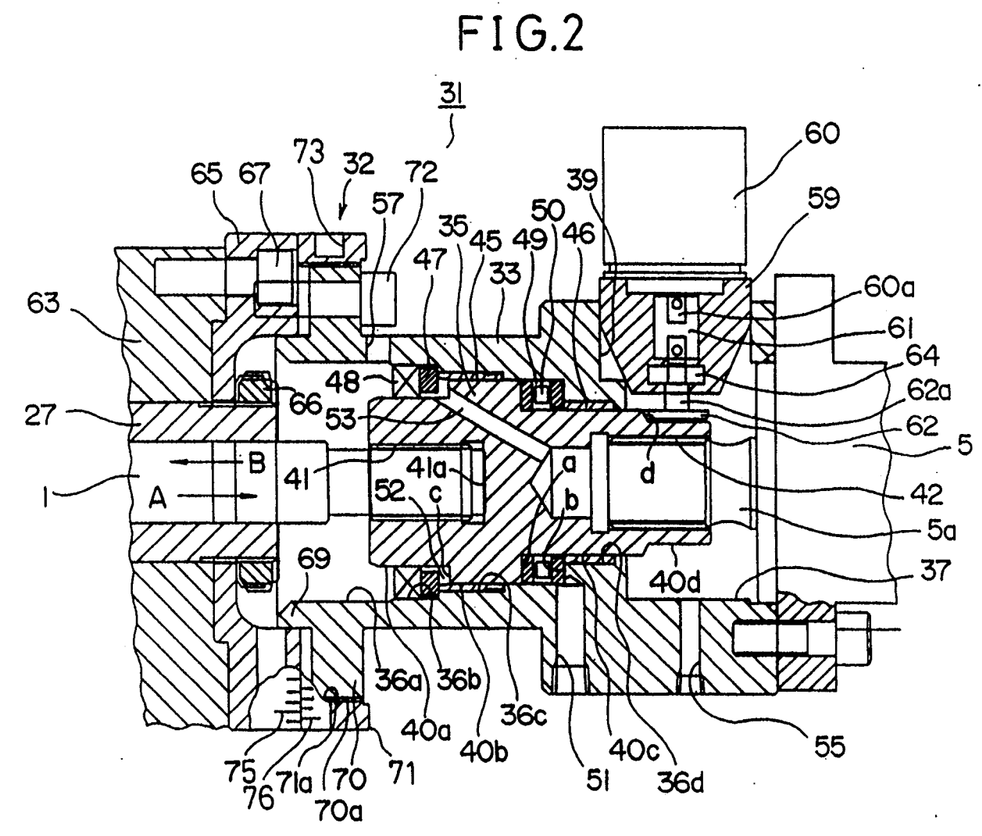
FIG. 2 is a sectional view showing a screw driving unit.

There is provided a screw driving unit 31 at the rear end of the plasticizing chamber 13, the unit 31 being fitted coaxially with an AC electric or hydraulic rotary motor 5. As shown in FIG. 2, the screw driving unit 31 is provided with a cylinder member 33 coupled with the screw casing 27 by way of a position adjusting device 32 and a piston member 35 fitted into the cylinder member 33. The cylinder member 33 has a stepped hole 36, whose outer diameter is gradually reduced from the screw side, a concave hole 37 and an encoder mount hole 39 that extends radially. There are formed, on the outer circumference of the piston member 35 a middle diameter portion 40a, a larger diameter portion 40b and a smaller diameter portion 40e as seen from the screw side, and a friction wheel receiver 40d. There are also provided a spline hole 41 in the center of an end of the piston member 35 for coupling with the screw and another spline hole 42 in the center of the other end for connecting with the motor.

A first radial supporting member 45 made of phosphoric bronze or plain bearing bush is interposed between the larger diameter portion 40b of the piston member 35 and a hole step 36c of the cylinder member 33. There is also interposed a second radial supporting member 46 between the smaller diameter portion 40c and a small diameter hole step 36d. In addition, there is interposed an oil seal 48 between the middle diameter portion 40a of the piston member and a hole 36b of the cylinder member 33, and a stopper ring 47 is also screwed in between to prevent the first radial supporting member 45 from coming off axially.

Figure 3:
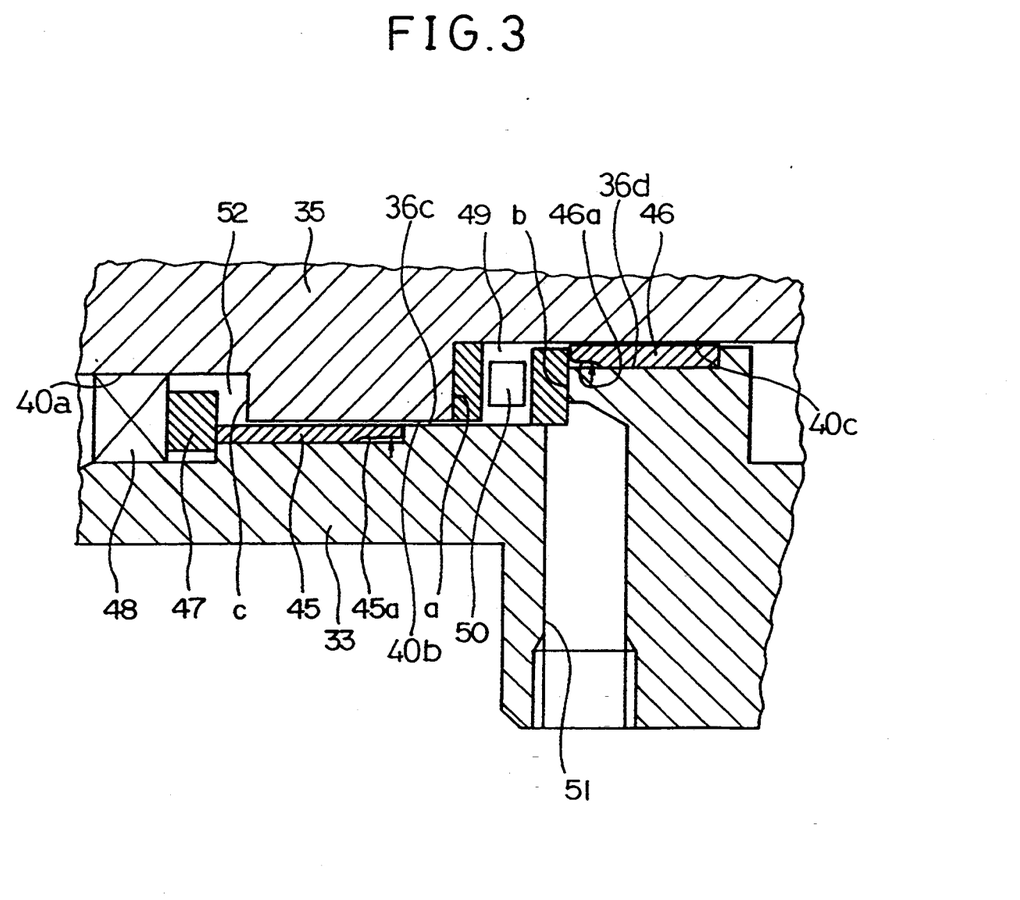
FIG. 3 is an enlarged sectional view showing a hydraulic chamber.

As detailed in FIG. 3, a hydraulic chamber 49 is formed between a deck A of the larger diameter portion 40b and the smaller diameter portion 40c of the piston member 35 and a deck B of the middle diameter hole step 36c and the smaller diameter hole step 36d of the cylinder member 33. There is interposed a thrust roller bearing 5o between the decks A and B in the hydraulic chamber 49. In addition, an oil path 51 connects with the hydraulic chamber 49 to supply pressurized oil from a change-over valve (not shown). The first and second radial supporting members 45, 46 are arranged on the right and the left sides of the hydraulic chamber 49, one on each side. These supporting members 45, 46 rotatively support the piston member 35 radially, and work as a seal as well, so that pressurized oil coming from the hydraulic chamber 49 may not leak. The supporting members 45, 46 are partially notched on the outer circumference facing the hydraulic chamber 49 to form thinned portions 45a, 46a.

There is formed a drain oil chamber 52 by the oil seal 48, the middle diameter portion 40a and the larger diameter portion 40b of the piston member 35. The drain oil chamber 52 constitutes a clearance to allow the piston member 35 to move axially, and is connected with the spline hole 42 by way of an oil path 53. Furthermore, there is formed in the cylinder member 35 a drain hole 55 leading from the concave hole 37 to the outside. There is also an air hole 57 formed there leading to the atmosphere from a chamber between the piston member 35 and the screw casing 27.

The base end of the screw 1 is spline connected with the spline hole 41 of the piston member 35 with an edge face in contact with a hole bottom 41a. The output shaft 5a of the rotary motor 5 is spline connected with the other spline hole 42. In addition, a rotary encoder 60 is mounted in the mount hole 39 in a radial direction of the cylinder member 33 by way of a housing 59, projecting in a radial direction of the cylinder member 33. An input shaft 60a of the encoder 60 is connected with a friction wheel shaft 62a by way of a coupling 61. The shaft 62a is rotatively supported by a bearing 64. There is secured a headless-conic friction wheel 62 to the tip of the shaft 62a. The wheel 62 is positioned in the friction wheel receiver 40d of the piston member 35, and is able to come into contact with an inclined deck D.

As detailed in FIG. 2, there is secured, on the other hand, a mount housing 63 to the base end of the screw casing 27, while a first flange 65 is secured thereto using a mount nut 66 and a mount bolt 67. There is formed, at an end of the cylinder member 33, a socket and spigot part 69 to engage with a ring concavity of the flange 65, and a second flange 70 is formed on the outer circumference of the part 69. There is formed a male screw 70a on the outer circumference of the flange 70, and a position adjusting ring member 71 having a female screw 71a is screwed onto the outer circumference of the flange 70. In addition, the second flange 70 and the first flange 65 are secured by means of fastening bolts 72 arranged at plural points on the circumference. As the piston moves, it thereby forms the position adjusting device 32 to adjust the stroke quantity of the piston member 35 forming the plasticizing chamber 23 with the tip of the screw 1 and the openness of the path opening 25a. There are provided concave holes 73 at specified intervals on the outer circumference of the position adjusting ring member 71, or a knurling tool is formed. The outer diameter of the adjusting ring 71 is almost the same as that of the first flange 65 when the ring is screwed into the second flange 70. Scales 75 and 76 are engraved in opposition to each other in an outer circumferential face of the first flange 65 and in that of the adjusting ring member 71. These scales enable direct reading of revolutional frequencies and rotational angles. If a vernier scale for a micrometer is available, however, a more detailed reading will be possible.

A description of the embodiment will follow in terms of how it works.

The rotary motor 5 rotates, and its rotation is transmitted to the plasticizing screw by way of the piston 35 in the plasticizing process. Such material as is supplied from a hopper (not shown) is thereby kneaded and heated and plasticized by means of a heater equipped in the cylinder 27 before it is transferred toward the plasticizing chamber at the tip of the screw 1. The screw 1 is pushed back by melt resin in a direction as indicated by an arrow A, opening the path opening 25a, which was previously closed. In addition, plasticized melt resin is forwarded to the injection chamber from the path opening 25a through the path 25, the opening 25a being open as the screw is at a retreat position. As the injection plunger 16 retreats, melt resin in the injection chamber 17 is weighed.

Melt resin pressure acts on the screw 1 as a reaction force when the screw 1 rotates, and the reaction force, in a direction as indicated by the arrow A, affects the piston member 35 when the rear end of the screw 1 comes into contact with the bottom 41a of the spline hole 41. Such reaction force is retained by the deck B of the cylinder member 33 from the deck A of the piston member by way of the thrust roller bearing 50. Accordingly, the tip of the screw is maintained in such a position as allows the opening 25a to remain open while the resin reaction force acting on the screw 1 is supported by the well lubricated thrust roller bearing 50, and rotation of the piston member 35 is supported by well lubricated radial supporting members 45 and 46, made of gun metal bush.

When the injection plunger 16 retreats to a specified extent, weighing melt resin in the injection chamber 17 to a specified level, the injection process comes next. The rotary motor first stops rotating in the injection process, stopping the screw 1, and pressurized oil is supplied to the hydraulic chamber by way of the oil path 51, moving the piston member in a direction as indicated by an arrow B. Then, such movement of the piston member 35 is transmitted to the screw 1 by way of the spline hole bottom 41a, bringing the tip of the screw 1 close to the path opening 25a to the extent that it is closed, preventing melt resin coming from the injection chamber 17 from flowing back. With this, pressurized oil is supplied to the injection hydraulic chamber 21, moving the injection plunger 16 by way of the ram 19 and the rod 18 to inject melt resin in the injection chamber 17 into the cavity of a metallic mold from the nozzle 22. Such melt resin is then maintained pressurized.

High injection pressure from the injection ram 19 acts then on the tip of the screw 1, and such pressure acts on the piston member 35 by way of the rear end of the screw 1. Axial force in a direction as indicated by an arrow A, affecting the piston member 35, is received by the cylinder member 33 by way of hydraulic pressure from the hydraulic chamber 49 without acting on the thrust roller bearing 50. In addition, high rotational force in a thrust load condition does not act on the radial supporting members 45 and 46 as the piston member 35 is at pause.

Further, pressurized oil comes from the oil path 51 out to the thrust roller bearing 50 to immerse it in the hydraulic chamber 49. If such oil is not as high in pressure as is specified, the oil penetrates between the first and second radial supporting members 45 and 46 and the piston member 35 as shown in FIG. 3. If the supplied oil reaches a specified pressure level, it will act on the thinned portions 45a and 46a of the radial supporting members 45 and 46, bringing the portions close to the piston member 35. Accordingly, pressurized oil is supplied from the hydraulic chamber 49 to in between of the radial supporting members 45 and 46 and the piston member 35 for only a moment when feeding starts. The radial supporting members 45 and 46 act thereafter as a seal to prevent oil from leaking from the hydraulic chamber 49, maintaining the chamber at a specified high pressure level. To supply oil momentarily to the radial supporting members 45 and 46, when the pressure is low, also serves to provide the sliding faces of the radial supporting members 45 and 46 with enough lubricating oil when oil is drained from the hydraulic chamber 49.

Even if pressurized oil is not supplied from the oil path 51 in the plasticizing process, enough lubricating oil is thus maintained in the thrust roller bearing 50 and at the radial supporting members 45 and 46. This enables the members 45 and 46 to receive the rotation of the piston member 35 and the bearing 50 to receive the reaction force acting on the piston member 35 in a well lubricated condition.

Oil oozing out from the first radial supporting member 45 is collected in the drain oil chamber 52 and introduced to the motor shaft spline hole 42 by way of an oil path 53. The output shaft 5a of the motor, sliding by a small quantity (about more than 1 mm) in response to travel of the piston member 35, is lubricated together with the spline hole 42, both being in spline engagement with each other. Finally, oil oozing out from the spline is discharged from the drain hole 55, together with such oil as oozes out from the second radial supporting member 46.

The rotary motor rotates, on the other hand, in the plasticizing process, putting the piston member 35 and the screw 1 into motion. The piston member 35 is then at a retreat position in a direction as indicated by the arrow A due to the screw reaction force, with the friction wheel 62 in contact with the inclined deck D. Rotation of the piston member is therefore transferred to the rotary encoder 60 by way of the friction wheel 62 to detect the frequency of revolution of the screw 1. In addition, the piston member 35 advances in a direction as indicated by the arrow B in the injection process to disconnect the friction wheel 62 with the inclined deck D. This shows, accordingly, that it is not possible to detect the revolution of the piston member 35, that is, the screw 1, but in such an instance the rotary motor 31 is at pause, and the screw 1 is also in the same condition, so that there is no need to sense the screw rotation using the encoder 60.

Referring now to FIG. 4, the adjustment of screw stroke using the position adjusting device 32 will be detailed.

Figure 4A:
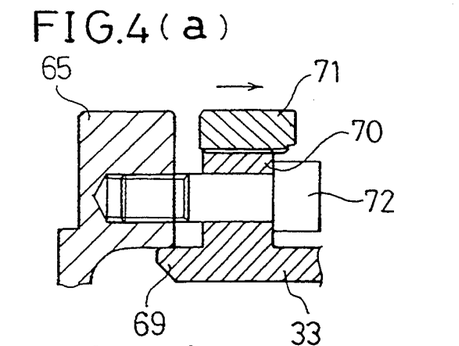
FIGS. 4(a), (b), (c), (d) and (e) enlarged views showing a screw position adjusting device and illustrating the respective operating positions in different conditions.

As shown in FIG. 4(a), for the purpose of adjusting the screw in stroke, first rotate the position adjusting ring member 71 backward (in the indicated arrow direction) to produce a sufficient clearance between the ring member 71 and the flange 65. Adjustment at the time of assembling is given by inserting the screw 1 spline in the spline hole 41 to bring the rear end into contact, with the bottom face 41a and inserting and positioning the socket and spigot part 69, and provisionally fastening the screw driving unit 31 using fastening bolts 70.

Figure 4B:
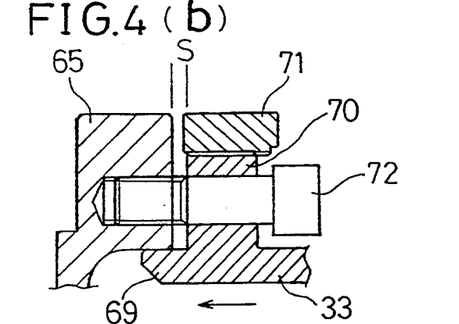

With this, as shown in FIG. 4(b), the screw driving unit 31 is pressurized in a forward (arrow) direction and guided by means of the socket and spigot part 69 by fastening plural fastening bolts 72 evenly until the tip of the screw closes the path opening 25a and comes into contact with the tip of the casing 27a. The screw stroke datum position S will be established where the tip of the screw is in contact with that of the casing and the screw is restricted for further movement.

Figure 4C:
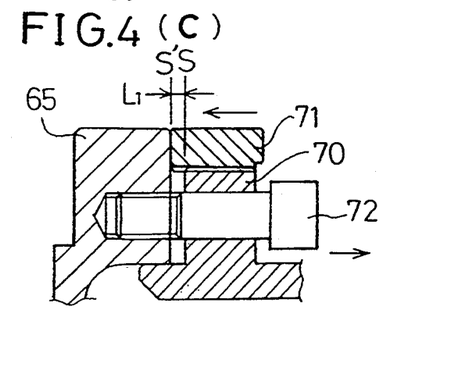

In addition, as shown in FIG. 4(c), rotate the position adjusting ring member 71 in a forward (arrow) direction under such conditions until the edge face on the projecting side comes to set a clearance $L_1$ between the datum position S and the flange Also, loosen the plural fastening bolts 72 to enable the screw driving unit to move backward.

Figure 4D:
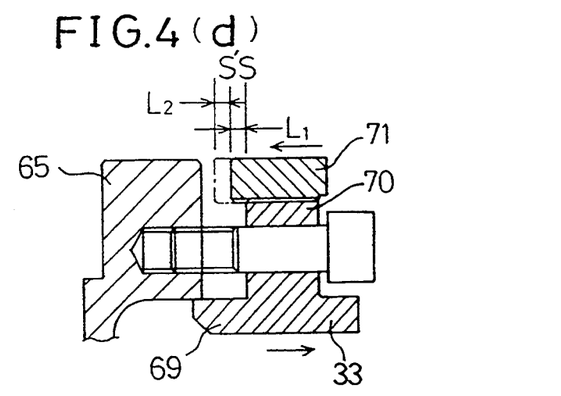

As shown in FIG. 4(d), move the screw driving unit 31 (accordingly, together with the flange 70) in a backward (arrow) direction to get the adjusting ring member 71 ready for moving. With this, rotate and move the ring member 71 in a forward direction to a specified level $L_2$ (about 1 mm) while looking at the scales 75 and 76. The traveling quantity of $L_2$ is the screw stroke quantity. That is, the datum position S' is established as to the adjusting ring member 71 where it has covered the clearance $L_1$, and the screw stroke quantity is represented by the traveling quantity $L_2$ from the datum position S'.

Figure 4E:
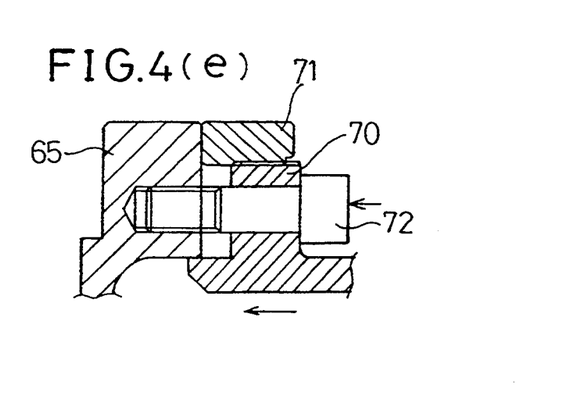

In addition, move the screw driving unit 31 with the traveling quantity $L_2$ set, as shown in FIG. 4(e), bring the edge face on the projecting side of the adjusting ring member 71 into contact with a side of the flange 65 and fasten plural fastening bolts 72. The stroke quantity $L_2$ is thereby set and positioned, according to which the screw 1 moves backward from the datum position S (S') where the tip thereof hits against that of the cylinder 27. By fastening plural fastening bolts 72, the adjusting ring member 71 is brought into contact with the side of the flange 5, and the ring member 71 is firmly screwed, preventing it from loosening during use.

According to the above description, the scales 75 and 76 are used to detect the rotational angle of the adjusting ring member 71 covering a specified traveling quantity of $L_2$, but other means are also available. It is also possible to directly detect the gap between the adjusting ring member 71 and the side of the flange 65 using a pair of calipers to set the gap to a specified level of $L_2$ by moving the screw driving unit 31 until the gap reaches the set level $L_2$. Then rotate the adjusting ring member 71 to bring it into contact with the side of the flange 65 and fasten with the fastening bolts 72 in this state. Another means is to detect the specified level $L_2$ by directly measuring projection quantity of the adjusting ring member 71 against the flange 70, using a depth gauge or a similar gauge.

Another arrangement is such that the position adjusting ring member 71 is provided onto the flange 65 on the screw casing side instead of the flange 70 on the cylinder member 33 side of the screw driving unit.

The screw driving unit in the foregoing embodiment comprises the screw 1 and motor output shaft 5a directly coupled with the piston member 35. The present invention includes, but is not limited to, the above. A screw driving unit with a link shaft, 2 as shown in FIG. 5 is also applicable. A screw pre-plasticization injection molding machine was taken up in the above description, but the principle and construction of the present invention are also applicable to an in-line screw injection molding machine wherein the screw is rotated by means of a rotary motor and it is moved axially by means of a hydraulic actuator.

TECHNICAL ADVANTAGES OF THE INVENTION

As mentioned above, the position adjusting device consists of a flange and a position adjusting ring member according to the present invention. Since the device is situated outside the screw casing and cylinder member, the operator may adjust the stroke quantity of the screw with ease by rotating and adjusting the adjusting ring member directly without removing the rotary motor.

Further, as the position adjusting ring member is situated externally and may be visually checked, it is possible to directly read the traveling quantity of the ring member in a direct manner, enabling accurate stroke adjustment.

Since the position adjusting device is installed externally between the screw casing and the screw driving unit, it is not necessary to provide it in the screw driving unit, thereby enabling the downsizing of the screw driving unit.

If the position adjusting ring member is installed on the flange on the cylinder member side of the screw driving unit, the cylinder member may be smaller in diameter and a space to fasten the fastening member may be produced on the outer circumference of the cylinder member, and it is not necessary to make the flange larger in diameter.

In addition, the screw driving unit may be removed from the screw casing for replacement at the portion where the position adjusting device is arranged.

Scales may be readily engraved by making the outer diameter of the adjusting ring member almost the same as that of the first flange. This assures accurate and reliable adjustment. Similar outer circumferences are deemed as more compact and excellent in design.

If the screw position adjusting device is applied to a pre-plasticization type injection molding machine wherein the path to the injection chamber is closed by the tip of the screw, the screw may be adjusted for position in an accurate and reliable manner, improving the injection molding machine performance. is desirable, in particular, to control the flow of resin into the injection chamber taking into account the fluidability of the resin by kind and the timing of closing the path when the screw advances in a proper manner. With the present invention, it is possible to readily as well as minutely, adjust the screw position in a mechanical manner according to the resin characteristics without using a complicated back pressure controller.

What is claimed is:

1. An apparatus, comprising:
an injection part having an injection chamber;
a plasticizing part comprising a cylindrical screw casing, a plasticizing screw disposed inside and coaxial with said screw casing, a cylinder member, a hydraulic piston member disposed inside and coaxial with said cylinder member and connected to said plasticizing screw, and a rotary motor secured to said cylinder member and operably connected with said hydraulic piston member;
a path communicating a front tip of said screw casing with said injection chamber; and
a screw position adjusting device comprising a first flange connected to said screw casing, a second flange connected to said cylinder member, a fastening arrangement coupling said first and second flanges with each other, a male screw on an outer surface of one of said first and second flanges, and a position adjusting ring member having a female screw engaging said male screw and a projecting side;
wherein said plasticizing screw is coaxial with said hydraulic piston member and said rotary motor; and
wherein said projecting side of said adjusting member projects into contact with the other of said first and second flanges.

2. The apparatus of claim 1, wherein said male screw is on said second flange and said position adjusting ring member has an outer diameter substantially equal to the outer diameter of said first flange.

3. The apparatus of claim 2, wherein said first flange and said position adjusting ring member have graduations on respective outer surfaces thereof located in opposition to each other.

4. The apparatus of claim 3, wherein said graduations define a vernier scale.

5. The apparatus of claim 1, wherein the other of said first and second flanges and said position adjusting ring member have graduations on respective outer surfaces thereof located in opposition to each other.

6. The apparatus of claim 5, wherein said graduations define a vernier scale.

* * * * *